United States Patent
Sturges et al.

(10) Patent No.: US 6,871,266 B2
(45) Date of Patent: Mar. 22, 2005

(54) CACHE SYSTEM

(75) Inventors: Andrew Craig Sturges, Bath (GB); David May, Clifton Bristol (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 0 days.

(21) Appl. No.: 10/446,280

(22) Filed: May 23, 2003

(65) Prior Publication Data

US 2003/0196041 A1 Oct. 16, 2003

Related U.S. Application Data

(63) Continuation of application No. 09/155,607, filed as application No. PCT/GB98/00268 on Jan. 29, 1998, now Pat. No. 6,594,729.

(30) Foreign Application Priority Data

Jan. 30, 1997 (GB) .............................................. 9701960

(51) Int. Cl.[7] .............................................. G06F 12/00
(52) U.S. Cl. ...................... 711/129; 711/171; 711/173
(58) Field of Search ................. 711/129–130, 147–148, 711/153, 171–172, 173

(56) References Cited

U.S. PATENT DOCUMENTS

| | | | |
|---|---|---|---|
| 4,463,424 A | | 7/1984 | Mattson et al. |
| 4,520,441 A | * | 5/1985 | Bandoh et al. .............. 711/203 |
| 4,654,782 A | | 3/1987 | Bannai et al. |
| 4,905,141 A | * | 2/1990 | Brenza ....................... 711/129 |
| 5,357,623 A | | 10/1994 | Megory-Cohen |
| 5,359,317 A | * | 10/1994 | Gomez et al. .............. 340/7.52 |
| 5,446,863 A | | 8/1995 | Stevens et al. |
| 5,487,162 A | | 1/1996 | Tanaka et al. |
| 5,537,635 A | | 7/1996 | Douglas |
| 5,584,014 A | | 12/1996 | Nayfeh et al. |
| 5,588,138 A | | 12/1996 | Bai et al. |
| 5,721,874 A | | 2/1998 | Carnevale et al. |
| 5,737,750 A | | 4/1998 | Kumar et al. |
| 5,796,944 A | | 8/1998 | Hill et al. |
| 5,809,522 A | | 9/1998 | Novak et al. |
| 5,875,464 A | * | 2/1999 | Kirk ........................... 711/129 |
| 5,875,465 A | * | 2/1999 | Kilpatrick et al. .......... 711/134 |
| 6,038,647 A | | 3/2000 | Shimizu |
| 6,295,580 B1 | | 9/2001 | Sturges et al. |
| 6,381,676 B2 | * | 4/2002 | Aglietti et al. .............. 711/133 |
| 6,453,385 B1 | | 9/2002 | Sturges et al. |
| 6,594,729 B1 | * | 7/2003 | Sturges et al. .............. 711/129 |

FOREIGN PATENT DOCUMENTS

| | | |
|---|---|---|
| GB | 2 311 880 A | 10/1997 |
| WO | WO 98/34172 | 8/1998 |

OTHER PUBLICATIONS

European Search Report for related European application No. 98 30 0515, search completed May 8, 1998.
European Search Report for related European application No. 98 30 0518, search completed May 8, 1998.
International Search Report for International application No. PCT/GB98/00268, filed Jan. 29, 1998.

(List continued on next page.)

*Primary Examiner*—Nasser Moazzami
(74) *Attorney, Agent, or Firm*—Lisa K. Jorgenson; James H. Morris; Wolf, Greenfield & Sacks, P.C.

(57) ABSTRACT

A cache system is provided which includes a cache memory and a cache refill mechanism which allocates one or more of a set of cache partitions in the cache memory to an item in dependence on the address of the item in main memory. This is achieved in one of the described embodiments by including with the address of an item a set of partition selector bits which allow a partition mask to be generated to identify into which cache partition the item may be loaded.

8 Claims, 4 Drawing Sheets

OTHER PUBLICATIONS

Standard Search Report for related application No. RS 99566, search completed Feb. 20, 1998.
Standard Search Report for related application No. RS 99958, search completed Feb. 20, 1998.
Patent Abstracts of Japan, Japanese Publication No. 08235072A, pub. date Sep. 13, 1996, Sun Microsystems Inc.
Patent Abstracts of Japan, Japanese Publication No. 04100158A, publication date Apr. 2, 1992, PFU Ltd.
Patent Abstracts of Japan, Japanese Publication No. 04049446A, publication date Feb. 18, 1992, NEC Corp.

Dongwook, K., et al., *A Partitioned On–Chip Virtual Cache for Fast Processors*, Journal of System Arch., vol. 43, No. 8, May 1997, pp. 519–531.

Kirk, D.B., *Smart (Strategic Memory Allocation for Real–Time) Cache Design*, Proceedings of the Rea Times Systems Symposium, Dec. 5, 1989, pp. 229–237.

Mueller F., *Compiler Support for Software–Based Cache Partitioning*, ACM Sigplan Notices, vol. 30, No. 11, Nov. 1, 1995, pp. 125–133.

* cited by examiner

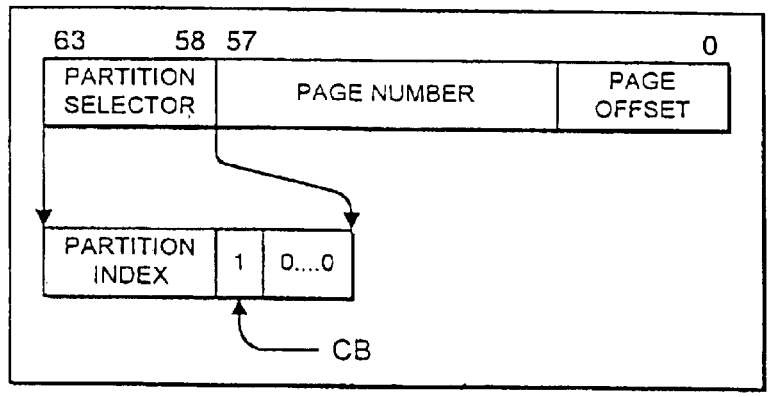
FIG. 7
| PARTITION SELECTOR | PARTITION MASK | SELECTED PARTITIONS |
|---|---|---|
| 000000 | XXXX | |
| 100000 | XXXX | |
| 110000 | 1XXX | |
| 011000 | 01XX | |
| 010100 | 010X | |
| 111110 | 1111 | |
FIG. 8
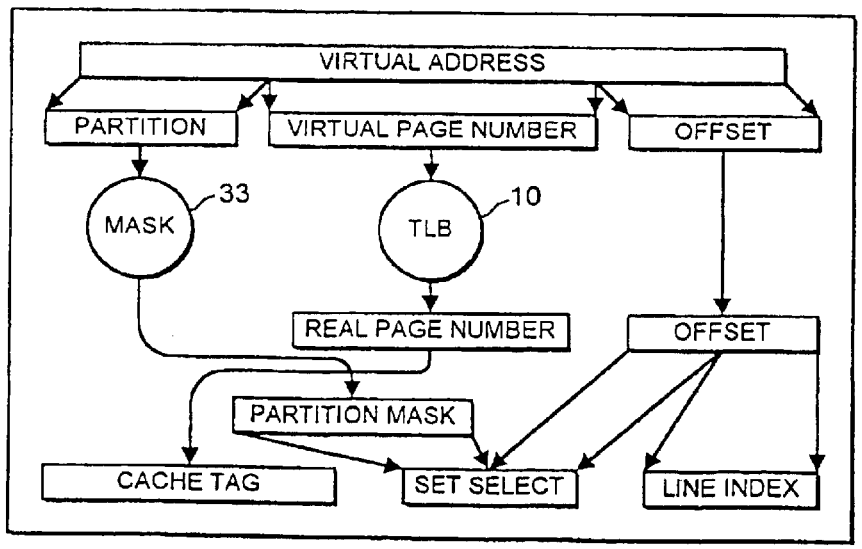
FIG. 9

CACHE SYSTEM

This application is a continuation of prior application Ser. No. 09/155,607, filed May 17, 1999, entitled "A CACHE SYSTEM," and now U.S. Pat. No. 6,594,729 which application is incorporated herein by reference.

FIELD OF THE INVENTION

The present invention relates to a cache system for operating between a processor and a main memory of a computer.

BACKGROUND TO THE INVENTION

As is well known in the art, cache memories are used in computer systems to decrease the access latency to certain data and code and to decrease the memory bandwidth used for that data and code. A cache memory can delay, aggregate and reorder memory accesses.

A cache memory operates between a processor and a main memory of a computer. Data and/or instructions which are required by the process running on the processor can be held in the cache while that process runs. An access to the cache is normally much quicker than an access to main memory. If the processor does not locate a required data item or instruction in the cache memory, it directly accesses main memory to retrieve it, and the requested data item or instruction is loaded into the cache. There are various known systems for using and refilling cache memories.

In order to rely on a cache in a real time system, the behavior of the cache needs to be predictable. That is, there needs to be a reasonable degree of certainty that particular data items or instructions which are expected to be found in the cache will in fact be found there. Most existing refill mechanisms will normally always attempt to place in the cache a requested data item or instructions. In order to do this, they must delete other data items or instructions from the cache. This can result in items being deleted which were expected to be there for later use. This is particularly the case for a multi-tasking processor, or for a processor which has to handle interrupt processes or other unpredictable processes.

It is an object of the present invention to provide a cache system which obviates or reduces this disadvantage and provides greater predictability of caching behavior.

SUMMARY OF THE INVENTION

In general, the present invention provides a cache system for operating between a processor and a main memory of a computer, the cache system comprising:

a cache memory having a set of cache partitions, each cache partition comprising a plurality of addressable storage locations for holding items fetched from said main memory for use by the processor, a cache refill mechanism arranged to fetch an item from the main memory and to load said item into the cache memory at one of said addressable storage locations, wherein the cache refill mechanism is operable to allocate to each said item fetched from the main memory one or more of said cache partitions in dependence on the address of said item in the main memory.

It is thus quite possible for an item to have access to more than one partition of the cache, or indeed for an item not to be allowed access to the cache at all.

In one arrangement, a cache partition access table holds in association with addresses of items to be cached respective multi-bit partition indicators identifying into which cache partition the item may be loaded. In the described embodiment of this arrangement, each address in main memory comprises a page number and a line-in-page number, the page numbers being held in a look-up table in association with their respective partition indicators.

In a virtual addressing system, the processor issues addresses comprising a virtual page number and line-in-page number. In that event, the system can comprise a translation look-aside buffer for translating the virtual page number to a real page number for accessing the main memory, the translation look-aside buffer also holding respective partition indicators in association with the real page numbers for identifying the cache partition into which the addressed item is to be loaded.

In another arrangement, a set of partition selector bits which are held as part of the virtual address itself. This set of partition selector bits is used to generate a partition mask which is used to control access to the cache.

In both arrangements, the line-in-page number of the items addressed can be used to identify the addressable storage location within the cache partition into which the item is to be located. That is, each cache partition could be direct-mapped. It will be apparent that it is not necessary to use all of the end bits of the item's address as the line-in-page number, but merely a set of appropriate bits. These will normally be near the least significant end of the address. Moreover, it will be appreciated that within a cache partition the addressing mechanism need not be direct mapped but could be fully associative.

One or more cache partitions may be allocated to a page in main memory.

The system can include a cache access circuit which accesses items from the cache memory according to the address in main memory of said items and regardless of the cache partition in which the item is held in the cache memory. That is, the partition indicator is only used on refill and not on look-up. Thus, a cached item can be retrieved from its partition even if subsequent to its caching that partition is now allocated to a different set of addresses.

According to another aspect of the invention there is provided a method of operating a cache memory arranged between a processor and a main memory of a computer, wherein, when the processor requests an item from main memory using an address in main memory for said item and that item is not held in the cache memory, said item is fetched from the main memory and loaded into one of a plurality of addressable storage locations in the cache memory, the addressable storage locations being arranged as a set of cache partitions and wherein one or more of said cache partitions is allocated to said item in dependence on the address of said item in main memory.

In one arrangement described herein, each address is associated with a multi-bit partition indicator identifying into which cache partition the item may be loaded. The partition indicator is held in a cache partition access table in association with the addresses of items to be cached. In another arrangement described herein, a set of partition selector bits is held as part of the virtual address itself. This set of partition selector bits is used to generate a partition mask for controlling access to the cache.

The main memory can hold a plurality of processes, each process including one or more sequence of instructions held at addresses in the main memory within a common page number. Cache partitions can be allocated by associating each cache partition with page numbers of a particular process in the main memory.

The number of addressable storage locations in each cache partition can be alterable. Also, the association of cache partitions to page numbers can be alterable while a process using these page numbers is being run by the processor.

The ability to provide flexible partitioning of a cache as described herein serves a number of useful purposes.

Inter-thread partitioning can be used to prevent trashing of the entire cache when accessing a large array. This is particularly effective when the routine is reading or writing each element only once.

Inter-thread partitioning prevents the caching behaviour of a critical process being perturbed by the cache activities of other processes. For instance, a real time task would not wish critical data to be removed from the cache.

If a single cache is used to hold both data and instructions, it is possible to partition the cache so that the data and instructions use different partitions.

The following described embodiments illustrate a cache system which gives protection of the contents of the cache against unexpected eviction by reading from or writing to cache lines from other pages of data which are placed in other partitions. It also provides a system in which the contents of the cache may be predicted.

For a better understanding of the present invention and to show how the same may be carried into effect, reference will now be made by way of example to the accompanying drawings.

BRIEF DESCRIPTION OF THE DRAWINGS

FIG. 7 is an example of a virtual address holding partition selector bits;

FIG. 8 is a table showing example partition selectors; and

FIG. 9 is a schematic diagram illustrating a cache partitioning mechanism.

DESCRIPTION OF THE PREFERRED EMBODIMENT

Figure 1:
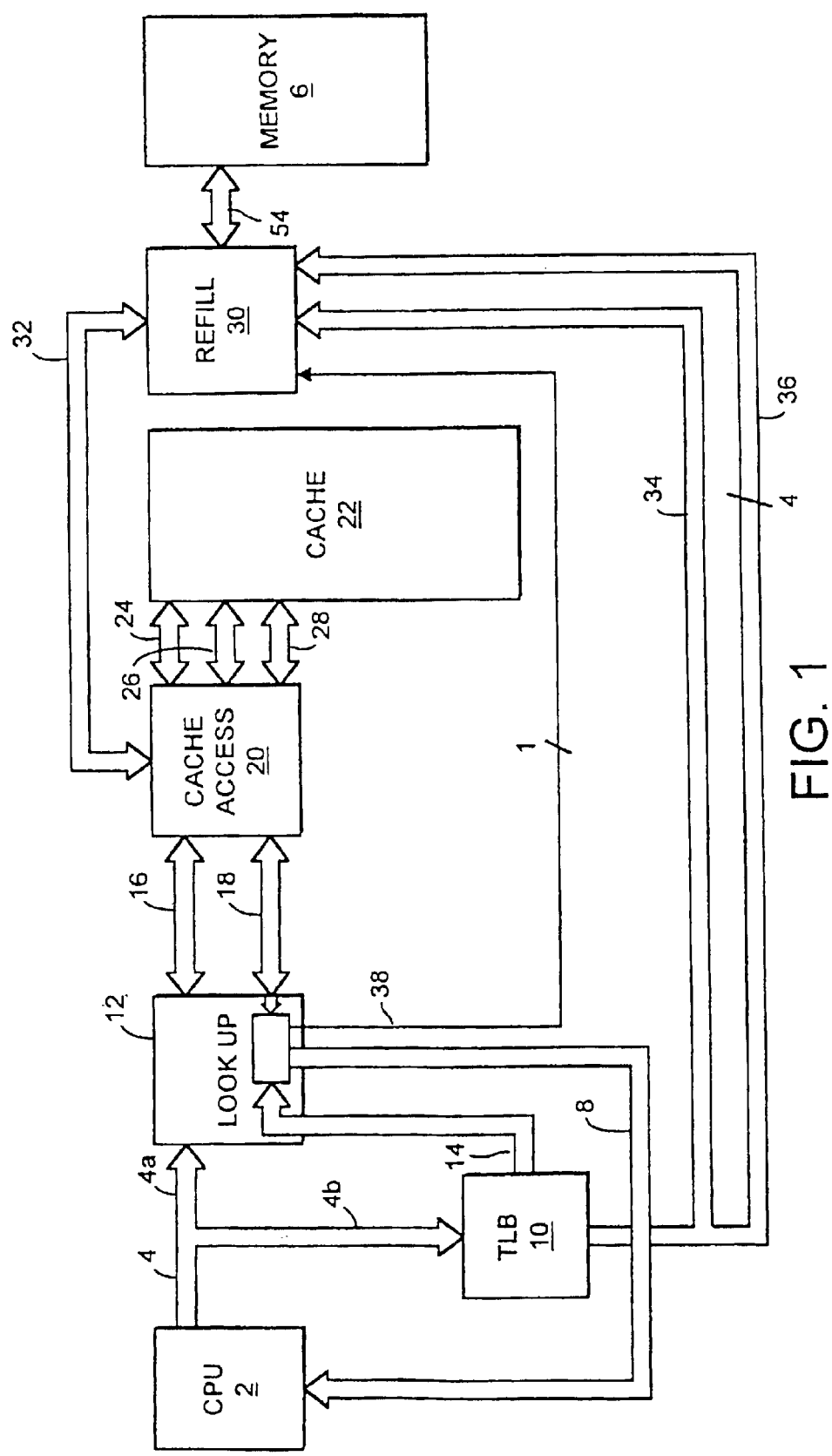
FIG. 1 is a block diagram of a computer incorporating a cache system.

FIG. 1 is a block diagram of a computer incorporating a cache system. The computer comprises a CPU 2 which is connected to an address bus 4 for accessing items from a main memory 6 and to a data bus 8 for returning items to the CPU 2. Although the data bus 8 is referred to herein as a data bus, it will be appreciated that this is for the return of items from the main memory 6, whether or not they constitute actual data or instructions for execution by the CPU. The system described herein is suitable for use on both instruction and data caches. As is known, there may be separate data and instruction caches, or the data and instruction cache may be combined. In the computer described herein, the addressing scheme is a so-called virtual addressing scheme although it will be understood that the cache partitioning schemes defined herein may be used with real addresses. The address is split into a line-in-page address 4a and a virtual page address 4b. The virtual page address 4b is supplied to a translation look-aside buffer (TLB) 10. The line-in-page address 4a is supplied to a look-up circuit 12. The translation look-aside buffer 10 supplies a real page address 14 converted from the virtual page address 4b to the look-up circuit 12. The look-up circuit 12 is connected via address and data buses 16,18 to a cache access circuit 20. Again, the data bus 18 can be for data items or instructions from the main memory 6. The cache access circuit 20 is connected to a cache memory 22 via an address bus 24, a data bus 26 and a control bus 28 which transfers replacement information for the cache memory 22. A refill engine 30 is connected to the cache access circuit 20 via a refill bus 32 which transfers replacement information, data items (or instructions) and addresses between the refill engine and the cache access circuit. The refill engine 30 is itself connected to the main memory 6.

The refill engine 30 receives from the translation look-aside buffer 10 a full real address 34, comprising the real page address and line-in-page address of an item in the main memory 6. The refill engine 30 also receives a partition indicator from the translation look-aside buffer 10 on a four bit bus 36. The function of the partition indicator will be described hereinafter.

Finally, the refill engine 30 receives a miss signal on line 38 which is generated in the look-up circuit 12 in a manner which will be described more clearly hereinafter.

The cache memory 22 described herein is a direct mapped cache. That is, it has a plurality of addressable storage locations, each location constituting one row of the cache. Each row contains an item from main memory and the address in main memory of that item. Each row is addressable by a row address which is constituted by a number of bits representing the least significant bits of the address in main memory of the data items stored at that row. For example, for a cache memory having eight rows, each row address would be three bits long to uniquely identify those rows. For example, the second row in the cache has a row address 001 and thus could hold any data items from main memory having an address in the main memory which ends in the bits 001. Clearly, in the main memory, there would be many such addresses and thus potentially many data items to be held at that row in the cache memory. Of course, the cache memory can hold only one data item at that row at any one time.

Operation of the computer system illustrated in FIG. 1 will now be described but as though the partition indicator was not present. The CPU 2 requests an item from main memory 6 using the address in main memory and transmits that address on address bus 4. The virtual page number is supplied to the translation look-aside buffer 10 which translates it into a real page number 14 according to a predetermined virtual to real page translation algorithm. The real page number 14 is supplied to the look-up circuit 12 together with the line-in-page number 4a of the original address transmitted by the CPU 2. The line-in-page address is used by the cache access circuit 20 to address the cache memory 22. The line-in-page address includes a set of least significant bits (not necessarily including the end bits) of the main address in memory which are equivalent to the row address in the cache memory 22. The contents of the cache memory 22 at the row address identified by the line-in-page address, being a data item (or instruction) and the address in main memory of the data item (or instruction), are supplied to the look-up circuit 12. There, the real page number of the address which has been retrieved from the cache memory (the so-called cache tag) is compared with the real page number which has been supplied from the translation look-aside buffer 10. If these addresses match, the look-up circuit indicates a hit which causes the data item which was held at that row of the cache memory to be returned to the CPU along data bus 8. If however the real page number of the address which was held at the addressed row in the cache memory 22 does not match the real page number supplied from the translation look-aside buffer 10, then a miss signal is generated on line 38 to the refill engine 30. It is the task of the refill engine 30 to retrieve the correct item from the main memory 6, using the real address which is supplied from the translation look-aside buffer 10 on bus 34. The data item, once fetched from main memory 6 is supplied to the cache access circuit 20 via the refill bus 32 and is loaded into the cache memory 22 together with the address in main memory. The data item itself is also returned to the CPU along data bus 8 so that the CPU can continue to execute. In a direct mapped cache memory as outlined above, it will be apparent that the data item and its address recalled from the main memory 6 will be loaded into the storage location from which the data item was originally accessed for checking. That is, it will be over-written into the only location which can accept it, having a row address matching the set of least significant bits in the line-in-page address in main memory. Of course, the page number of the data item originally stored in the cache memory and the data item which is now to be loaded into it are different. This "one to one mapping" limits the usefulness of the cache.

Figure 2:
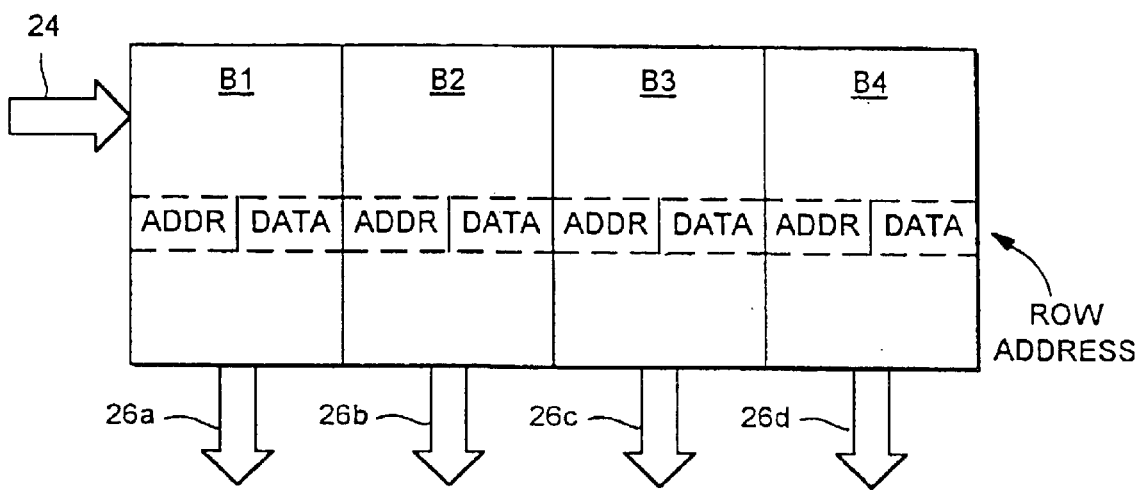
FIG. 2 is a sketch illustrating a four way set associative cache.

To provide a cache system with greater flexibility, an n-way set associative cache memory has been developed. An example of a 4-way set associative cache is illustrated in FIG. 2. The cache memory is divided into four banks B1,B2,B3,B4. The banks can be commonly addressed row-wise by a common row address, as illustrated schematically for one row in FIG. 2. However, that row contains four cache entries, one for each bank. The cache entry for bank B1 is output on bus 26a, the cache entry for bank B2 is output on bus 26b, and so on for banks B3 and B4. Thus, this allows four cache entries for one row address (or line-in-page address). Each time a row is addressed, four cache entries are output and the real page numbers of their addresses (the cache tags) are compared with the real page number supplied from the translation look-aside buffer 10 to determine which entry is the correct one. If there is a cache miss upon an attempted access to the cache, the refill engine 30 retrieves the requested item from the main memory 6 and loads it into the correct row in one of the banks, in accordance with a refill algorithm which is based on, for example, how long a particular item has been held in the cache, or other program parameters of the system. Such replacement algorithms are known and are not described further herein.

Nevertheless, the n-way set associative cache (where n is the number of banks and is equal to four in FIG. 2), while being an improvement on a single direct mapped system is still inflexible and, more importantly, does not allow the behavior of the cache to be properly predictable.

The systems described herein provides a cache partitioning mechanism which allows the optimisation of the computer's use of the cache memory by a more flexible cache refill system.

A first cache partitioning scheme will be described with reference to FIG. 3.

In the translation look-aside buffer 10 each TLB entry has associated with the virtual page number, a real page number and an information sequence. An example entry is shown in FIG. 3, where VP represents the virtual page number, RP represents the real page number and INFO represents the information sequence. The information sequence contains various information about the address in memory in a manner which is known and which will not be described further herein. However, according to the presently described system the information sequence additionally contains a partition indicator PI, which in the described embodiment is four bits long. Thus, bits 0 to 3 of the information sequence INFO constitute the partition indicator.

The partition indicator gives information regarding the partition into which the data item may be placed when it is first loaded into the cache memory 22. For the cache structure illustrated in FIG. 2, each partition can constitute one bank of the cache. In the partition indicator, each bit refers to one of the banks. The value of 1 in bit j of the partition indicator means that the data in that page may not be placed in partition j. The value of 0 in bit j means that the data in that page may be placed in partition j. Data may be placed in more than one partition by having a 0 in more than one bit of the partition indicator. A partition indicator which is all zeros allows the data to be placed in any partition of the cache. A partition indicator which is all ones does not allow any data items to be loaded into the cache memory. This could be used for example for "freezing" the contents of the cache, for example for diagnostic purposes.

Figure 3:
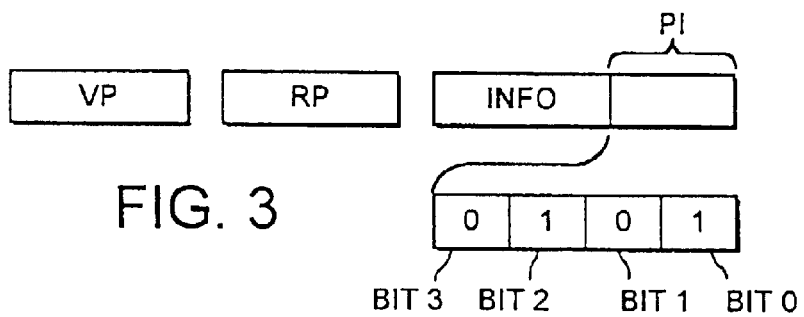
FIG. 3 is an example of an entry in a translation look-aside buffer.

In the example given in FIG. 3, the partition indicator indicates that replacement of data items which have that real page number in main memory may not use banks B1 or B3 but may use banks B2 or B4.

It is quite possible to allocate more than one bank to a page. In that case, if the line-in-page address has more bits than the row address for the cache, the partitions would behave as a k-way set associative cache, where k partitions are allocated to a page. Thus, in the described example the real page number of FIG. 3 can use banks B2 and B4. However, it may not use banks B1 and B3.

The partition information is not used on cache look-up, but only upon cache replacement or refill. Thus, the cache access can locate data items held anywhere in the cache memory, whereas a replacement will only replace data into the allowed partitions for that page address.

Figure 4:
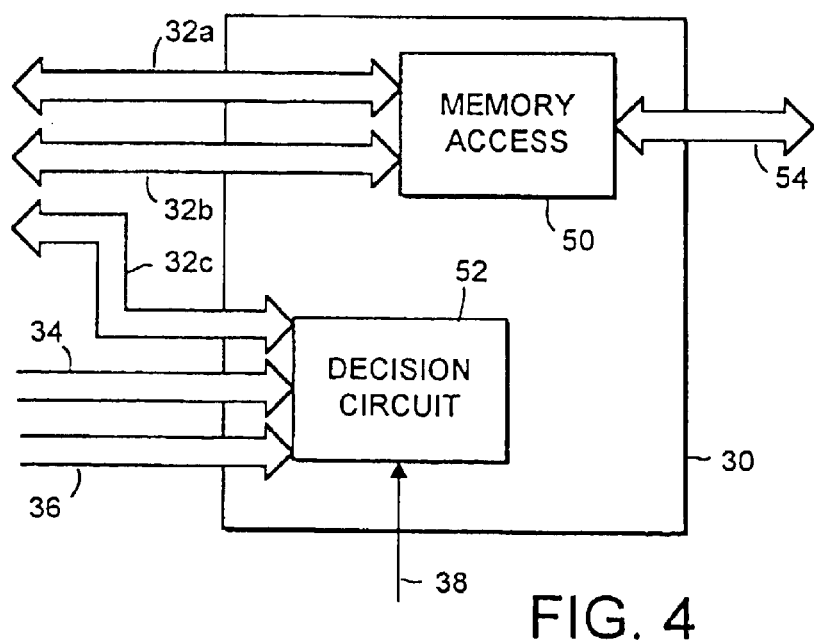
FIG. 4 is a block diagram of the refill engine.

FIG. 4 illustrates in more detail the content of the refill engine 30. The refill bus 32 is shown in FIG. 4 as three separate buses, a data bus 32a, an address bus 32b and a bus 32c carrying replacement information. The address and data buses 32a and 32c are supplied to a memory access circuit 50 which accesses the main memory via the memory bus 54. The replacement information is fed to a decision circuit 52 which also receives the real address 34, the partition indicator P1 on bus 36 and the miss signal 38. The decision circuit 52 determines the proper partition of the cache into which data accessed the main memory is to be located.

The partition indicator PI can be set in the TLB like any other TLB entry. In the described example, the partition indicators are set by kernel mode software running on the CPU 2 and it is the responsibility of that kernel mode software to ensure that pages which should not be placed in a particular cache partition do not have their partition indicator bits set for that partition. However, a user may alter partitions by requesting that the cache partitions be altered. In that event, the CPU 2 would change to kernel mode to implement the request, change the TLB entries accordingly and then return to the user mode to allow the user to continue. Thus, a user can alter the partitioning behavior of the cache, thus providing much greater flexibility than has hitherto been possible.

Figure 5:
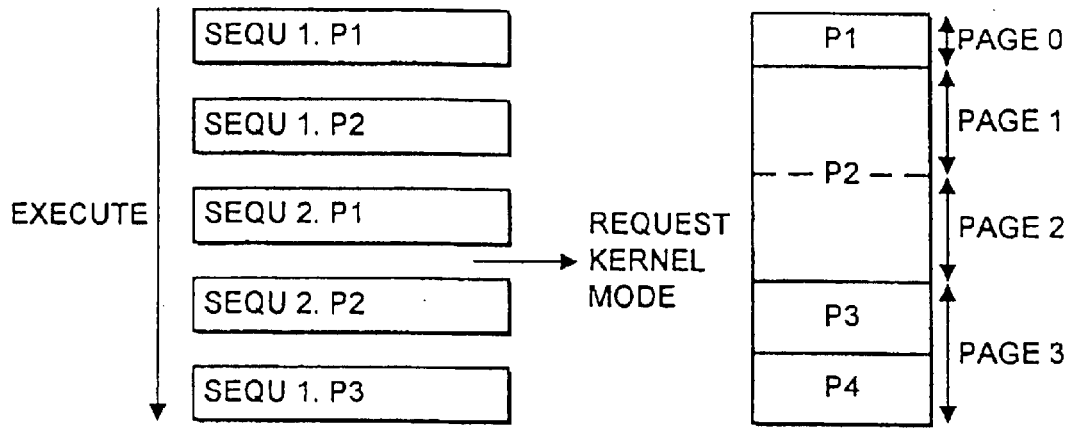
FIG. 5 is a diagram illustrating the operation of a multi-tasking processor.

The cache partitioning mechanism described herein is particularly useful for a multi-tasking CPU. A multi-tasking processor is capable of running more than one process "simultaneously". In practice, the processor executes part of a process and, when that process is halted for some reason, perhaps in need of data or a stimulus to proceed, the processor immediately begins executing another process. Thus, the processor is always operating even when individual processes may be held up waiting for data or another stimulus to proceed. FIG. 5 illustrates diagrammatically such a situation. On the left hand side of FIG. 5 is illustrated the sequence which a processor may undertake to run different processes P1,P2,P3,P4. On the right hand side of FIG. 5 is an illustration of where these processes may expect their data to be held in memory. Thus, the data for the process P1 are held on page 0. The data for process P2 are held on pages 1 and 2. Data for processes P3 and P4 share page 3. In the example, the processor executes a first sequence of process P1, a first sequence of process P2, a second sequence of process P1, a second sequence of process P2 and then a first sequence of process P3. When the second sequence of the process P1 has been executed, the process P1 has been fully run by the processor. It will readily be apparent that in a conventional cache system, once the processor has started executing the first sequence of the process P2, and is thus requesting accesses from page 1, the data items and instructions in these lines will replace in the cache the previously stored data items and instructions from page 0. However, these may soon again be required when the second sequence of the process P1 is executed.

Figure 6:
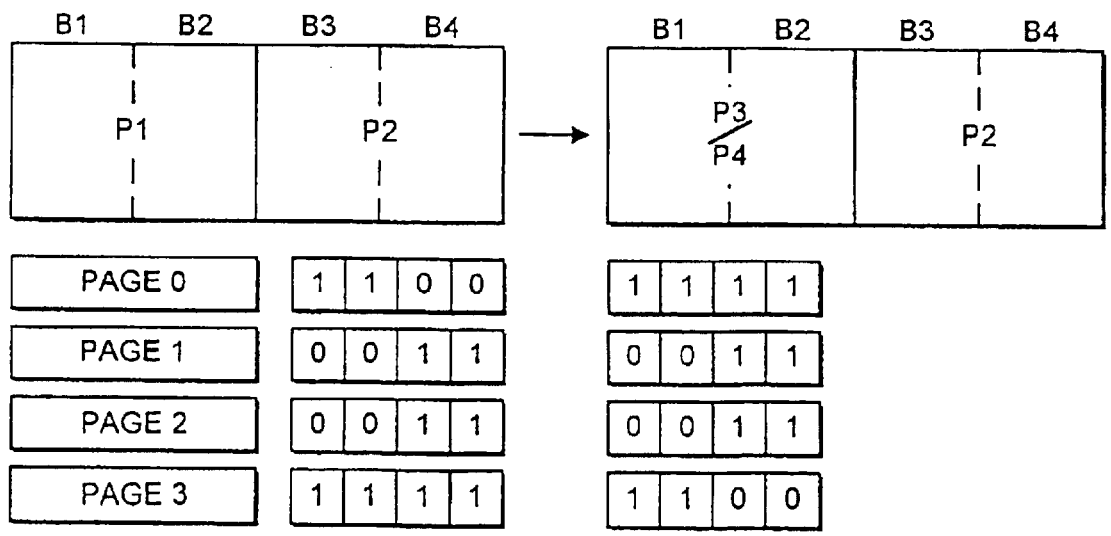
FIG. 6 is a diagram illustrating the alteration in caching behavior for the system of FIG. 5.

The cache partitioning mechanism described herein avoids the timing delays and uncertainties which can result from this. FIG. 6 shows the partitioning of the cache while the processor is running process P1, and the change in the partitioning when the processor switches to running P3 etc. FIG. 6 also shows the TLB cache partition indicators for each case. Thus, on the left hand side FIG. 5 shows the cache partitioned while the processor is running processes P1 and P2. The process P1 may use banks B1 and B2 of the cache, but may not use banks B3 and B4. Conversely, the process P2 may use banks B3 and B4, but not banks B1 and B2. This can be seen in the TLB entries below. This is, page 0 has a cache partition indicator allowing it to access banks B1 and B2, but not B3 and B4. Pages 1 and 2 have cache partition indicators allowing them to access banks B3 and B4 but not B1 and B2. Page 3 has a cache partition indicator which prevents it from accessing the cache. Thus, any attempt by the processor to load data items from the process P3 into the cache would be prohibited. For the described process sequence, this however is not a disadvantage because, as can be seen, the processor is not intending to execute any part of the process P3 until it has finished executing process P1. If it did for some reason have to execute P3, the only downside would be that it would have to make its accesses from direct memory and would not be allowed use of the cache.

When the process P1 has finished executing, the processor can request kernel mode to allow it to alter the cache partition indicators in the TLB. In the described embodiment, kernel processes do not have access to the cache. Instead they modify the TLB entries for the partition indicators to modify the behavior of the cache. The change is illustrated on the right hand side of FIG. 6. Thus, now the cache partition indicators prevent the process P1 from using the cache at all, but allocate banks B1 and B2 to the processes P3 and P4, by altering the cache partition indicator for page 3 so that it can access these banks of the cache. Thus, when the processor is expecting to execute the process P3, it now has a cache facility.

A second cache partitioning scheme will now be described with reference to FIGS. 7 to 9. It will readily be appreciated that the second scheme can be used in a multi-tasking processor to achieve a similar effect to that described with reference to FIGS. 5 and 6. The second scheme allows greater flexibility of cache partitioning because it allows not only the number of partitions to be selected, but also the size of those partitions. According to the second cache partitioning scheme, a set of partition selector bits (6 bits in the described embodiment) are held as part of a virtual address. FIG. 7 illustrates the arrangement in which bits 0 to 57 hold the virtual page number and page offset (referred to earlier as line-in-page) and bits 58 to 63 are the partition selector bits. The partition selector bits include a partition index (which is a bit sequence comprising any number of bits between zero and five) and a guard bit GB set to one. If there are any remaining bits to the right hand side of the guard bit (depending on the length of the partition index sequence), these bits are set to zero. The partition selector bits are used to generate a partition mask which serves the same function as the partition indicator described earlier in that it controls access of data items to the cache. The guard bit GB marks the start of the partition index sequence and controls into how many portions the cache is divisible. The scheme described herein supports sixteen cache partitions. Note that in FIG. 8 the partitions are numbered from right to left from partition zero. The size of the partition depends on how many partitions the cache is divided into.

FIG. 8 illustrates some examples. The shaded part indicates the available partition for that address. In the first line of FIG. 8, the guard bit is not set at all and therefore all of the cache is available. In the second line of FIG. 8, the guard bit is set in the left-most position, again indicating that the entire cache is available. In the third line of FIG. 8, the guard bit is set in the second position which indicates that the cache is to be divided into two partitions. The partition index is set to 1 indicating that PARTITION 1 is available. Thus, half of the cache is shown shaded. In the fourth row of FIG. 8, the guard bit is set in the third bit position, indicating that there are four cache partitions. The partition index sequence is 01, indicating that PARTITION 1 is available for use. In the fifth line of FIG. 8, the guard bit is set in the fourth bit position, indicating that there are eight cache partitions. The partition index sequence 010 denotes that PARTITION 2 is available. Finally, in the last line of FIG. 8 the guard bit is set in the fifth bit position indication that there are sixteen partitions and the partition index denotes that PARTITION 15 is available.

Thus, the guard bit denotes the number (and then the size) of cache partitions. The partition index denotes the position of the cache partition available for use.

FIG. 9 is a schematic diagram illustrating implementation of the second cache partitioning scheme. In FIG. 9, the circles marked TLB (reference number 10) and Mask (reference numeral 33) denote hardware, while the rectangles denote bit sequences. The TLB 10 performs the same function as in FIG. 1. The mask circuit 33 receives the partition selector bits from the virtual address and generates the partition mask as described above with reference to FIG. 8. The partition mask is used together with the offset to generate set select bits and line index bits for addressing the cache. In other respects, the second cache partitioning scheme is used in the same context as described earlier for the first cache partitioning scheme.

It will be appreciated that the present invention is not restricted to the specifically described embodiment above. Some particular possible variations are mentioned below, but this is not a comprehensive list of the variations which are possible within the scope of the invention.

In the described embodiment above, the address issued by the CPU on address bus 4 is split into a virtual page number 4b and a line-in-page 4a. However, the invention can also be used in a situation where the entire virtual address is sent from the CPU to the look-up circuit for the cache. Conversely, the invention is also applicable in a situation where the CPU issues real addresses. In the second cache partitioning scheme, no TLB would be required. What is important is that the cache partition indicator is provided in association with the address in main memory.

In the embodiment described above, a single cache access circuit 20 is shown for accessing the cache both on look-up and refill. However, it is also possible to provide the cache with an additional access port for refill, so that look-up and refill take place via different access ports for the cache memory 22.

In the described embodiment, the refill engine 30 and cache access circuit 20 are shown in individual blocks. However, it would be quite possible to combine their functions into a single cache access circuit which performs both look-up and refill.

What is claimed is:

1. A method of operating a cache memory arranged between a processor and a main memory of a computer, wherein, when the processer requests an item from main memory using an address in main memory for said item and that item is not held in the cache memory, said item is fetched from the main memory and loaded into one of a plurality of addressable storage locations in the cache memory, the addressable storage locations being arranged as a set of cache partitions and wherein each address includes a multi-bit partition selector identifying into which cache partition the item may be loaded so that one of said cache partitions is allocated to said item in dependence on the address of said item in main memory, said partition selector defining a number of cache partitions into which the cache is divisible, wherein the number of cache partitions is alterable during operation of the cache.

2. A method according to claim 1, each address in main memory comprises a page number and a line-in-page number and wherein a plurality of processes are held in the main memory, each process including one or more sequence of instructions held at addresses in main memory with a common page number.

3. A method according to claim 2, wherein one of said cache partitions is allocated to a process by associating said one cache partition with page numbers of that process in the main memory.

4. A method according to claim 1, wherein the number of addressable storage locations in each cache partition is alterable.

5. A method according to claim 1, wherein the association of cache partitions to page numbers is alterable while a process using these page numbers is being run by the processor.

6. A cache memory to operate between a processor and a main memory of a computer, the cache memory including a number of cache partitions, each cache partition having a size, the size of each cache partition and the number of cache partitions being alterable based on a number of processes pending for execution in the processor, wherein one of said cache partitions is allocated to a process by associating said one cache partition with page numbers of that process in the main memory.

7. The cache memory of claim 6, wherein the number of cache partitions ranges from one to sixteen.

8. The cache memory of claim 6, wherein each of said cache partitions includes a number of addressable storage locations and wherein the number of addressable storage locations in each cache partition is alterable.

* * * * *

UNITED STATES PATENT AND TRADEMARK OFFICE
CERTIFICATE OF CORRECTION

PATENT NO. : 6,871,266 B2
DATED : March 22, 2005
INVENTOR(S) : Andrew Craig Sturges and David May It is certified that error appears in the above-identified patent and that said Letters Patent is hereby corrected as shown below:

Column 9,
Line 27, should read:
-- wherein, when the processor requests an item from main --

Column 10,
Line 4, should read:
-- 2. A method according to claim 1, wherein each address in main --

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,871,266 B2
DATED : March 22, 2005
INVENTOR(S) : Andrew Craig Sturges and David May It is certified that error appears in the above-identified patent and that said Letters Patent is hereby corrected as shown below:

Column 9,
Line 27, should read -- wherein, when the processor requests an item from main --

Column 10,
Line 4, should read -- 2. A method according to claim 1, wherein each address in main --

Signed and Sealed this

Thirty-first Day of May, 2005

JON W. DUDAS
*Director of the United States Patent and Trademark Office*